(12) United States Patent
Zavadinka

(10) Patent No.: US 11,041,510 B2
(45) Date of Patent: Jun. 22, 2021

(54) HYDRAULIC PRESSURE AMPLIFIER ARRANGEMENT

(71) Applicant: PistonPower Aps, Soenderborg (DK)

(72) Inventor: Peter Zavadinka, Chocholna-Velice (SK)

(73) Assignee: PISTONPOWER APS, Soenderborg (DK)

( * ) Notice: Subject to any disclaimer, the term of this patent is extended or adjusted under 35 U.S.C. 154(b) by 170 days.

(21) Appl. No.: 16/153,068

(22) Filed: Oct. 5, 2018

(65) Prior Publication Data

US 2019/0120258 A1   Apr. 25, 2019

(30) Foreign Application Priority Data

Oct. 19, 2017 (EP) .................................. 17197238

(51) Int. Cl.
| | |
|---|---|
| *F15B 3/00* | (2006.01) |
| *F15B 11/032* | (2006.01) |
| *F15B 11/02* | (2006.01) |
| *F15B 15/20* | (2006.01) |
| *F04B 9/107* | (2006.01) |
| *F16K 31/16* | (2006.01) |

(52) U.S. Cl.
CPC ............... *F15B 3/00* (2013.01); *F04B 9/107* (2013.01); *F04B 9/1076* (2013.01); *F15B 11/022* (2013.01); *F15B 11/0325* (2013.01); *F15B 15/204* (2013.01); *F15B 2211/214* (2013.01); *F16K 31/16* (2013.01)

(58) Field of Classification Search
CPC ...... F15B 3/00; F15B 11/022; F15B 11/0325; F15B 15/204; F15B 2211/214; F04B 9/107; F04B 9/1076
See application file for complete search history.

(56) References Cited

U.S. PATENT DOCUMENTS

| | | | | |
|---|---|---|---|---|
| 3,720,484 | A | * | 3/1973 | Kirshsieper ............... F15B 3/00 417/401 |
| 3,811,795 | A | * | 5/1974 | Olsen ........................ F03C 1/10 417/53 |

(Continued)

FOREIGN PATENT DOCUMENTS

| | | |
|---|---|---|
| CN | 101709653 A | 5/2010 |
| CN | 203769811 U | 8/2014 |

(Continued)

*Primary Examiner* — Christopher S Bobish
(74) *Attorney, Agent, or Firm* — McCormick, Paulding & Huber PLLC

(57) ABSTRACT

A hydraulic pressure amplifier arrangement (1) is described comprising a supply port (A1), a pressure outlet (A2) connected to the supply port via check valve means (3), an intensifier section (5) having a high pressure piston (6) in a high pressure cylinder (7), a low pressure piston (8) in a low pressure cylinder (9) and connected to the high pressure piston (6), and a control valve (12) controlling a pressure in the low pressure cylinder (9), wherein the control valve (12) comprises a hydraulically actuated valve element (13). Such a pressure amplifier arrangement should have a good operational behavior in a cost effective manner. To this end the control valve (12) comprises spring means 16 acting on the valve element (1) in a direction towards a starting position of the control valve.

4 Claims, 1 Drawing Sheet

(56) References Cited

U.S. PATENT DOCUMENTS

| | | | | |
|---|---|---|---|---|
| 4,601,642 A * | 7/1986 | Andrews | ............ | F15B 3/00 |
| | | | | 417/225 |
| 5,170,691 A * | 12/1992 | Baatrup | ............ | F04B 9/107 |
| | | | | 417/403 |
| 6,295,914 B1 * | 10/2001 | Iversen | ............ | F15B 3/00 |
| | | | | 91/300 |
| 6,776,080 B2 * | 8/2004 | Hansen | ............ | F04B 9/107 |
| | | | | 91/297 |
| 7,237,983 B2 * | 7/2007 | Suilmann | ............ | E21D 23/0418 |
| | | | | 405/302 |
| 7,354,252 B2 * | 4/2008 | Baatrup | ............ | F04B 9/107 |
| | | | | 417/245 |
| 7,597,545 B2 * | 10/2009 | Pedersen | ............ | F15B 3/00 |
| | | | | 417/225 |
| 8,613,602 B2 * | 12/2013 | Iversen | ............ | F15B 3/00 |
| | | | | 417/225 |
| 2012/0304633 A1 * | 12/2012 | Rozzi De Hieronymis | ............ | |
| | | | | F15B 15/204 |
| | | | | 60/393 |
| 2017/0321728 A1 * | 11/2017 | Iversen | ............ | F04B 7/04 |

FOREIGN PATENT DOCUMENTS

| | | | |
|---|---|---|---|
| CN | 105465063 A | 4/2016 | |
| CN | 205806047 U | 12/2016 | |
| DE | 1502208 A1 | 3/1970 | |
| DE | 102007017665 A1 | 10/2008 | |

\* cited by examiner

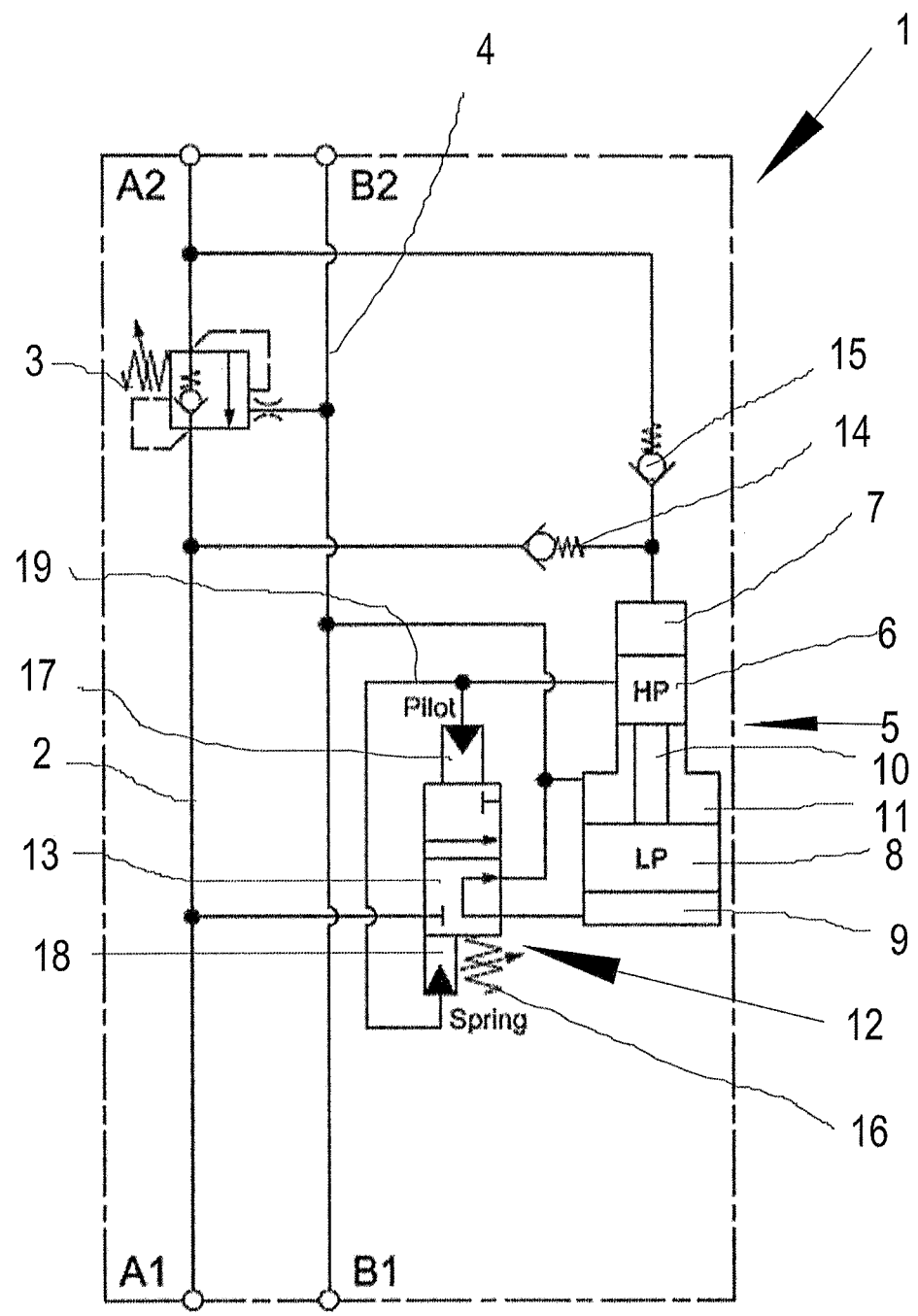

HYDRAULIC PRESSURE AMPLIFIER ARRANGEMENT

CROSS-REFERENCE TO RELATED APPLICATION

This application claims foreign priority benefits under U.S.C. § 119 to European Patent Application No. EP 17197238.3 filed on Oct. 19, 2017, the content of which is hereby incorporated by reference in its entirety.

TECHNICAL FIELD

The present invention relates to a hydraulic pressure amplifier arrangement comprising a supply port, a pressure outlet connected to the supply port via check valve means, an intensifier section having a high pressure piston in a high pressure cylinder, a low pressure piston in a low pressure cylinder and connected to the high pressure piston, and a control valve controlling a pressure in the low pressure cylinder, wherein the control valve comprises a hydraulically actuated valve element.

BACKGROUND

Such a pressure amplifier arrangement is known, for example, from the cartridge pressure amplifier CA 50-50 of PistonPower ApS, Nordborg, Denmark.

The known pressure amplifier arrangement is part of a hydraulic actuator. When the pressure supplied to the pressure amplifier arrangement at the supply port is sufficient to operate the actuator, the hydraulic fluid is directly guided from the supply port to the pressure output thereby bypassing the intensifier section. When, however, the load which has to be moved by the hydraulic actuator is so large that the supply pressure is not sufficient, the intensifier section is automatically activated and amplifies the pressure supplied to the supply port by a factor resulting from the ratio between the pressure areas of the low pressure piston and the high pressure piston.

In the known pressure amplifier arrangement the intensifier section is activated by means of a sequence valve. When the pressure required by the load to be moved the high pressure cylinder is filled with hydraulic fluid from the supply port. At the same time the sequence valve is actuated to guide hydraulic fluid from the supply port to the control valve.

Such a construction has, however, the drawback that it is complicated and prone to vibrations. This typically causes noise problems.

SUMMARY

The object underlying the invention is to achieve a good vibrational behavior in a cost effective manner.

This object is solved with a hydraulic pressure amplifier arrangement as described at the outset in that the control valve comprises spring means acting on the valve element in a direction towards a starting position of the control valve.

In such a construction it is no longer necessary to use a sequence valve. The control valve is automatically positioned in a correct starting position. In this starting position the low pressure cylinder and an intermediate space between the low pressure piston and the high pressure piston are short circuited and at the same time connected to a return or tank port. Only in case a load connected to the pressure outlet requires a higher pressure, the high pressure cylinder is filled with hydraulic fluid under pressure and the intensifier section starts working. The connection between low pressure piston and high pressure piston needs only to transmit thrust forces, i.e. a rod between the low pressure piston and the high pressure piston can be a piece for itself.

In an embodiment of the invention the valve element comprises a pilot pressure area and an inlet pressure area, wherein a pressure on the inlet pressure area acts in the same direction as a force of the spring means, and a pressure on the pilot pressure area acts in the opposite direction, wherein the pilot pressure area is larger than the inlet pressure area. Only when the force generated by the pressure on the pilot pressure area exceeds the combination of the force of the pressure acting on the inlet pressure area and the force of the spring, the valve element is moved.

In an embodiment of the invention the pressure on the pilot pressure area is the same as the pressure on the inlet pressure area. No further valve means are necessary to establish different pressure on the both sides of the valve element. When the pressure acting on both pressure areas reaches a high level the force resulting from the difference in the pressure areas will become greater than the force of the spring so that the valve element is moved.

In an embodiment of the invention the input pressure area is arranged in an input pressure chamber and the spring means are arranged in the input pressure chamber. The spring means occupy a part of the volume of the input pressure chamber so that a smaller amount of hydraulic fluid has to be supplied into input pressure chamber. This means that the volume of the fluid which has to be discharged is minimal resulting in minimal or zero pressure oscillation.

In an embodiment of the invention the spring means generate a preload force which is equal to a difference between the pilot pressure area and the inlet pressure area multiplied with an inlet pressure. The inlet pressure is a pressure supplied to the supply port which is generally known. Using the product of the difference between the areas and the inlet pressure allows for a rather accurate dimensioning of the spring means.

In a second aspect of the invention the invention relates to a hydraulic actuator comprising a cylinder and a piston moveable in this cylinder, wherein a pressure amplifier arrangement as described above is part of the piston. The pressure amplifier arrangement can, for example, be located in a piston rod connected to the piston.

BRIEF DESCRIPTION OF THE DRAWING

A preferred embodiment of the invention is now described with reference to the drawing, in which:

the Only FIGURE shows a circuit diagram of a hydraulic pressure amplifier arrangement.

DETAILED DESCRIPTION

A pressure amplifier arrangement 1 comprises a supply port A1 and a pressure outlet A2 connected to the supply port A1 via a line 2 in which check valve means 3 are arranged. In the present embodiment the check valve means are in form of an over center valve.

Furthermore, the pressure amplifier arrangement 1 comprises a return port B2 and a tank port B1. The return port B2 and the tank port B1 are connected by a line 4.

An intensifier section 5 is arranged in parallel to line 2. The intensifier section 5 comprises a high pressure piston 6 in a high pressure cylinder 7 and a low pressure piston 8 in a low pressure cylinder 9.

The high pressure piston 6 and the low pressure piston 9 are connected by a rod 10 or any other connection means. The rod 10 is arranged in an intermediate space 11. It is sufficient that the rod 10 transmits a movement in one direction from the low pressure piston 8 to the high pressure piston 6 and in the opposite direction from the high pressure piston 6 to the low pressure piston 8, i.e. it can be a piece for itself.

Control of the pressure in the low pressure cylinder 9 is performed by means of a control valve 12. The control valve comprises a valve element 13. In the position shown in the FIGURE the valve element connects the low pressure piston 8 and the intermediate space 11 and at the same time connects the low pressure cylinder 9 with the tank port B1.

The valve element 13 can be switched into another position in which it connects the supply port A1 and the low pressure cylinder 9 via the line 2. The switching of the valve element 13 will be explained below.

Furthermore, the high pressure cylinder 7 is connected to the line 2 and the supply port A1 via a check valve 14 opening in a direction towards the high pressure cylinder 7. Furthermore, the high pressure cylinder 7 is connected to the pressure outlet A2 via a check valve 15 opening in a direction towards the pressure outlet A2.

The valve element 13 is loaded by spring means 16 into a direction towards a starting position of the control valve 12. The starting position is the position described above in which the low pressure cylinder 9 and the intermediate space 11 are connected to the tank port B1.

Furthermore, the valve element 13 comprises a pilot pressure area 17 and an inlet pressure area 18. The pilot pressure area 17 is larger than the inlet pressure area 18. The pressure on the inlet pressure area 18 acts in the same direction as a force generated by the spring means 16.

The pilot pressure area 17 and the inlet pressure area are connected to a line 19 which opens into the high pressure cylinder 7. However, during a stroke of the high pressure piston 6 the opening of line 19 into the high pressure cylinder 7 is covered by the high pressure piston 6 and thus closed.

The inlet pressure area 18 is part of an inlet pressure chamber, i.e. the inlet pressure area 18 is a limitation of the inlet pressure chamber. The spring means 16 are arranged in the inlet pressure chamber (not shown in detail in the drawing). This has the advantage that the spring means occupy a part of the volume of the inlet pressure chamber so that less volume of hydraulic fluid has to be displaced during movement of the valve element 13.

The pressure amplifier arrangement can be part of a hydraulic actuator. In particular, it can be arranged in a piston rod of a piston of a hydraulic piston cylinder arrangement forming the hydraulic actuator.

The operation of the hydraulic pressure amplifier arrangement 1 as shown can be described as follows:

Hydraulic fluid having a supply pressure is supplied to the supply port A1 and is delivered to the pressure outlet A2 via line 2 and the over center valve 3. In this mode of operation the two check valves 14, 15 are closed. There is no hydraulic fluid reaching the high pressure cylinder 7. The high pressure piston remains in a position in which the opening of line 19 into the high pressure cylinder 7 is covered.

The spring means 16 have moved and hold the valve element 13 in the position shown. This position is called "starting position" in which the low pressure cylinder 9 and the intermediate space 11 are connected and at the same time connected to the tank port B1. Hydraulic fluid returning from a consumer connected to the pressure outlet A2 enters the amplifier arrangement via the return port B2 and leaves the amplifier arrangement 1 via the tank port B1.

When, however, the load connected to the pressure outlet A2 requires a force which can no longer be produced by the "normal" supply pressure, the pressure in the line 2 increases and opens check valve 14 to supply hydraulic fluid into the high pressure cylinder 7. The supply of fluid into the high pressure cylinder 7 moves the high pressure piston 6. After a predetermined movement the high pressure piston 6 opens line 19 and releases a connection between the high pressure cylinder 7 and line 19. Now the supply pressure (pressure at the supply port A1) acts via line 19 on the pilot pressure area 17 on the one hand and on the inlet pressure area 18 on the other hand. Since the pilot pressure area 17 is larger than the inlet pressure area 18 the force resulting from this difference in pressure areas exceeds the force of the spring means 16 so that the valve element 13 is moved in the other position in which the low pressure cylinder 9 is connected to line 2 and to the supply port A1.

The supply pressure in the low pressure cylinder 9 acts on the low pressure piston 8 which in turn moves the high pressure piston 6 in a direction to decrease the volume of the high pressure cylinder 7. Hydraulic fluid under the higher pressure is outputted via check valve 15 to the pressure outlet A2. The pressure increase corresponds to the ratio between the area of the low pressure piston 8 and the area of the high pressure piston 6.

During the movement of the high pressure piston 6 the line connecting the high pressure cylinder 7 to the pilot pressure area 17 and to the inlet pressure area 18 is closed. However, the pressure trapped in line 19 will hold the valve element in the position in which hydraulic fluid under pressure is supplied to the low pressure cylinder 9.

As soon as the high pressure piston 6 has reached its upper dead point the line 19 is opened to the intermediate space 11 which is connected to the tank port B1, as mentioned above. As soon as line 19 is connected to the tank port B1 the pressure on the pilot pressure area 17 and the pressure on the inlet pressure area 18 will suddenly decrease to tank pressure so that the force of the spring 16 is larger than the force resulting from the pressures on the pilot pressure area 17 and the inlet pressure area 18 so that the valve element 13 is shifted back into its starting position. In the starting position the pressure in the high pressure cylinder 7 is able to move the combination of high pressure piston 6 and low pressure piston 8 again in a direction to decrease the volume of the low pressure cylinder 9. The intermediate space 11 and the low pressure cylinder 9 are connected to the tank port B1.

As soon as the high pressure piston 6 again releases the opening of line 19 into high pressure cylinder 9 the cycle of operation starts again.

Since only a small volume of hydraulic fluid has to be displaced during the movement of the valve element 13 high frequencies can be reached without having the risk of unwanted oscillations.

The spring means 16 can be designed in such a way that a preload force of spring means 16 is equal to a difference between the pilot pressure area 17 and the inlet pressure area 18, wherein this difference is multiplied with the pressure at the supply port A1.

The use of spring means 16 allows the control valve 12 to ensure the control function and at the same time the starting function. Due to less components, the amplifier can be made small and cheap.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic pressure amplifier arrangement comprising a supply port, a pressure outlet connected to the supply port via check valve means, an intensifier section having a high pressure piston in a high pressure cylinder, a low pressure piston in a low pressure cylinder and connected to the high pressure piston, and a control valve controlling a pressure in the low pressure cylinder, wherein the control valve comprises a hydraulically actuated valve element,
- wherein the control valve comprises spring means acting on the valve element in a direction towards a starting position of the control valve,
- wherein the starting position is a position in which the lower pressure cylinder and an intermediate space between the high pressure piston and the lower pressure piston are connected to a return port or a tank port, wherein the valve element comprises a pilot pressure area and an inlet pressure area,
- wherein a pressure on the inlet pressure area acts in the same direction as a force of the spring means, and a pressure on the pilot pressure area acts in the opposite direction,
- wherein the pilot pressure area is larger than the inlet pressure area,
- wherein the pressure on the pilot pressure area is the same as the pressure on the inlet pressure area, and
- wherein the pressure on the pilot pressure area is the same as the pressure on the inlet pressure area when the intermediate space and the low pressure cylinder are connected to the pilot pressure area and the inlet pressure area, and when the high pressure cylinder is connected to the pilot pressure area and the inlet pressure area.

2. The arrangement according to claim 1, wherein the inlet pressure area is arranged in an inlet pressure chamber and the spring means are arranged in the inlet pressure chamber.

3. The arrangement according to claim 1, wherein the spring means generate a preload force which is equal to a difference between the pilot pressure area and the inlet pressure area multiplied with an inlet pressure.

4. The arrangement according to claim 2, wherein the spring means generate a preload force which is equal to a difference between the pilot pressure area and the inlet pressure area multiplied with an inlet pressure.

* * * * *